the fineness of division of the raw material. In any event, the digestion is finished when a smooth slurry of pulp and acid liquor has been obtained. In general, the color of said slurry will be deep yellow.

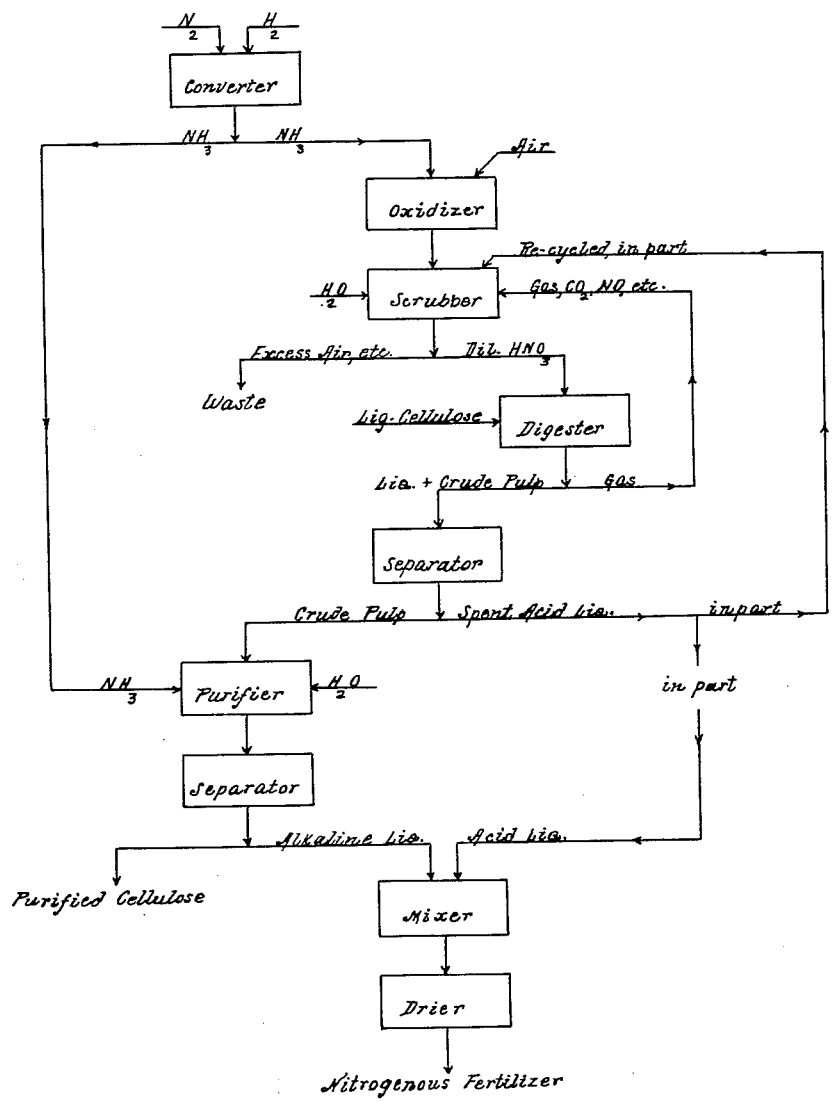

3,130,115
METHOD OF PROCESSING LIGNIFIED CELLULOSE
Alfred M. Thomsen, 265 Buckingham Way, Apt. 402, San Francisco, Calif.
Filed Oct. 27, 1961, Ser. No. 148,131
10 Claims. (Cl. 162—16)

By the term "lignified cellulose" I imply in the widest sense that combination of cellulose and lignin of which the vegetable world builds the skeletal structures for the support of softer tissues, often referred to under the term "woody." It has been known since last century that such material may be resolved into a mass of fibers by decomposing and dissolving the cementing ligneous material by means of nitric acid and a pulping technique has been based on this reaction. However, to the best of my knowledge, no commercial operation has been successful save one German plant which utilized it as a means of disposal for a waste acid resulting from a diverse operation.

I believe that I have overcome the difficulties encountered by previous researchers in this field by the specific use I make of ammonia thus obtaining only two final products from my operation, to wit: A highly refined type of cellulose and a nitrogenous, organic fertilizer consisting of the non-cellulose components of the raw material together with substantially all nitric acid and ammonia employed in the operation. In other words, a pulping process with no deleterious waste products.

The process is best understood by following the steps I have set down in my drawing which will next be fully explained. Afterwards I shall give sundry examples, using different types of my raw material, "lignified cellulose," but while the results differ, the process is essentially the same in all cases. I commence with a conventional ammonia plant, at the point where the actual ammonia is made, namely in the converter, which I have so designated.

Of course, the making of ammonia, per se, is no part of my process but inasmuch as the object of my process is to end with a fertilizer it would be an economic fallacy to use purchased ammonia as by far the largest amount of ammonia made is consumed in the fertilizer field. And the ammonia maker is selling direct to the user or distributor. But whatever the source I then show this ammonia divided in two parts, the relative proportions being made clear later on. One part, the left portion, is retained "as is" for future use, the right hand portion is directly converted into dilute nitric acid. This is an entirely conventional step to which I have added nothing so no description is necessary.

In the "digester" this dilute nitric acid is commingled with the raw material, some type of lignified cellulose. The digester is merely a closed tank fitted with an agitator, and must, of course, be of material unattacked by the acid. Stainless steel serves very well. Depending upon the type of raw material used the acid usage will vary from 50% to 100% of the weight of lignified cellulose. The acid concentration can be anything from 3% to 6% of actual $HNO_3$. The amount must be enough to pulp the raw material and said material should be as "short" as possible as penetration is entirely along the fiber, not transverse.

The temperature of the digestion is kept near boiling, and there is a copious evolution of gas, largely carbon dioxide, but containing some nitrogen oxides as well and a little HCN. Said gas is, therefore, noxious, and I have shown it re-cycled to the absorption stage of the nitric acid making. The circuit is, therefore, "closed" against losses of "fixed" nitrogen. The duration of the digestion may vary from 2 hours to 6 hours, depending largely upon the fineness of division of the raw material. In any event, the digestion is finished when a smooth slurry of pulp and acid liquor has been obtained. In general, the color of said slurry will be deep yellow.

The chemical reactions between acid and non-cellulose is most obscure. Three definite phases are involved, to wit: hydrolysis, oxidation, and nitration. The cellulose appears to be unacted upon, but many organic acids are produced, acetic, formic, and oxalic being in evidence. A portion of the non-cellulosic ingredients is dissolved in the acid liquor but a considerable amount of insoluble material remains as an incrustation on the cellulose fibers. In the "separator," which is any type of filter or screen, I then show separation made between the spent liquor and the crude pulp, the latter passing on to the "purifier."

This device can simply be another agitated tank as it only serves to commingle the crude pulp with the reserved ammonia referred to at the start, together with sufficient water to make it mechanically docile. The resulting magma is then separated in another "separator," into a clean pulp and a deep yellow ammoniacal solution, the residue left upon the "crude pulp" being readily soluble in ammonia water. The resultant fiber will now be a very light yellow, often almost white.

Returning now to the spent liquor separated from the "crude pulp," as previously described, I have shown this as divided into two parts, one part being re-cycled to the absorption phase of the nitric acid step thus increasing the solid content of the liquor utilized in the digester, and minimizing subsequent evaporation. This must be done with some caution for the soluble contents of the "spent liquor" are still capable of reacting with fresh acid thus occasioning some loss. I believe that the re-cycle must be limited to 50% of the total so that the gain in avoided evaporation be not lost in unprofitable use of nitric acid. Only actual plant performance will determine the proper proportion.

I have then shown the portion of spent liquor which was not re-cycled sent on to a "mixer" where it is commingled with the ammoniacal liquor resulting from the pulp purification. The proper ratio between the two streams of $NH_3$ with which my process commenced will now become self evident. It is desirable that the proportion be such that the two liquors commingling in the "mixer" are able to substantially neutralize one another, prior to the final step of evaporation in the "drier," where any volatile ammonia would be lost.

The final result is an organic nitrogen fertilizer representing all dissolved organic material in combination with some form of "fixed" nitrogen. It is an exceedingly complex substance consisting essentially of ammonia salts, and a portion of said ammonia is indirectly derived from the nitric acid which in the digestion is partly reduced to ammonia. It also contains some nitrated organics as well as ammonium nitrate derived from the neutralization of free nitric acid in the spent digestion liquor.

The value of this material as a fertilizer depends in a large measure on this very complexity, as a portion of said nitrogen is immediately available while more portions are progressively made available due to decomposition in the soil. Meanwhile the ligneous material becomes ultimately useful as a humus builder in the soil itself, this constituting a "long term" gain. It is obvious that in the "mixer" any other desirable ingredients may be added so that the final product becomes a complete fertilizer. It is equally obvious that where freight conditions permit it may be advantageous to retain the final product in the liquid form and thus escape the drying step altogether. In such an event the prohibition of volatile ammonia, previously referred to, becomes inoperative, it being evident that a liquid end product can be deliberately, "ammoniated" to any extent desired. Having thus described my process in general, but with sufficient specific information to permit any one duly familiar with the diverse aspects involved, to operate said process, I will now give sundry specific examples.

(1) The raw material will be old paper of that low classification referred to as "mixed," which means that a large part is old "news," hence consisting largely of ground wood. 100 lbs. will require 50 lbs. of nitric acid, and the concentration will be 5%. After two hours at 97° C. the slurry is passed on to a filter and the crude fiber separated, the spent liquor being recycled to the nitric acid absorption stage, the remainder going to the mixer. The crude pulp from the filter is then commingled with some 20 lbs. of $NH_3$ and sufficient water to render the mass mobile. The pulp thus purified is separated from the ammoniacal liquor which is then commingled with the acid liquor previously sent to the mixer. The amount of ammonia required in this later step is then adjusted so as to render the mixed liquors substantially neutral.

(2) In this example the raw material is sawdust. The nitric acid concentration remains the same, but the amount is increased to 65 lbs., the digestion requires four hours at 97° C. and the purification step about one hour due to the coarser texture of the raw material. In the former example this purification step is so rapid that the time required in commingling and filtering is adequate, hence no time element was mentioned. The remaining steps described in the first example are identical with Example 2.

(3) In this final example the raw material is the entire plant of the cotton-bearing shrub after said cotton has been harvested. It is cut down, shredded, and commingled with 5% nitric acid, but the amount is raised to 75 lbs. per 100 lbs. of raw material. Under certain conditions it may pay to strip later maturing "bolls" with compressed air and suction before any shredding is attempted. The time of digestion will be increased to six hours, the temperature will remain at 97° C. The time for ammonia treatment will be as in Example 2, or 1 hr. All other conditions remain the same.

It is obvious that the cellulose yield will depend too much upon the actual type and condition of the raw material involved but one item is rather constant, to wit: the nitrogen content of the final dry substance derived on desiccation of the treating liquors. With only minimal departure I have found that said nitrogen content remains almost constant at 20% on the dry weight of the recovered solids. This is presumably due to the fact that the greater use of acid is needed to remove a greater amount of non-cellulosic substances.

Having thus fully described my process with adequate examples on diverse types of raw material,

I claim:

1. In the further processing of ammonia derived from the catalyzed reaction between compressed hydrogen and nitrogen, the steps which comprise; dividing the ammonia into two portions and reserving one portion for subsequent use; oxidizing the remaining portion into nitric acid and recovering said acid in dilute form by absorption in water; commingling said dilute acid with a comminuted form of lignified cellulose and heating the mixture to approximate boiling temperatures until substantially pulped; separating the crude fibrous resulting product from the acid spent liquor and reserving said liquor for subsequent treatment; commingling the crude fiber previously separated with the reserved ammonia and digesting the mixture until substantially all ammonia-soluble substances have been removed from the crude pulp; separating said cleaned pulp from the ammoniacal liquor and commingling said liquor with the reserved acid spent liquor previously described thus producing a mixture of organic and inorganic nitrogen compounds suitable for use as a fertilizer.

2. In the pulping process set forth in claim 1, the additional step that the gas generated by interaction between nitric acid and lignified cellulose, be re-cycled to the nitric acid absorption step thus rendering said gas innocuous and preventing the loss of nitrogen oxides contained therein.

3. In the pulping process set forth in claim 1, the additional step that approximately one-half of the acid spent liquor obtained therein be re-cycled to the nitric acid absorption step thus increasing the percentage of total solids in the liquor subsequently commingled with the ammoniacal liquor.

4. In the pulping process set forth in claim 1, the additional step that the ammonia required to form the ammoniacal liquor described therein be so proportioned, with reference to the nitric acid spent liquor produced therein, that said acid liquor and said ammoniacal liquor will mutually neutralize one another when commingled in the final step described therein.

5. In the pulping process set forth in claim 4, the added step that the final mixed solution obtained therein be dehydrated thus yielding a solid substance containing approximately 20% of nitrogen.

6. The method of pulping a lignified cellulose by the sole use of ammonia and of nitric acid derived by oxidation from ammonia which comprises; dividing said ammonia into two portions and reserving one portion for subsequent use; oxidizing the remaining portion into nitric acid and recovering said acid in dilute form by absorption in water; commingling said dilute acid with a comminuted form of lignified cellulose and heating the mixture to approximate boiling temperature until said lignified cellulose is reduced to a pulp; separating the crude fibrous product from the spent acid liquor and reserving said liquor for subsequent treatment; commingling the crude fiber thus obtained with the reserved portion of ammonia and digesting the mixture until substantially all ammonia-soluble substances have been removed from the crude pulp; separating the resultant cleaned pulp from the ammoniacal liquor and commingling said liquor with the reserved acid spent liquor previously described thus producing a mixture of organic and inorganic nitrogen compounds suitable for use as a fertilizer.

7. The method of pulping a lignified cellulose set forth in claim 6, with the added step that the gas generated by interaction between nitric acid and lignified cellulose be re-cycled to the nitric acid absorption step thus rendering said gas innocuous and preventing the loss of nitrogen oxides contained therein.

8. The method of pulping a lignified cellulose set forth in claim 6, with the added step that approximately one-half of the acid spent liquor obtained therein be re-cycled to the nitric acid absorption step, thus increasing the percentage of total solids in the liquor subsequently commingled with the ammoniacal liquor.

9. The method of pulping a lignified cellulose set forth in claim 6, with the added step that the ammonia required to form the ammoniacal liquor described therein be so proportioned, with reference to the nitric acid spent liquor produced therein, that said acid liquor and said ammoniacal liquor shall mutually neutralize one another when commingled in the final step described therein.

10. The method of pulping a lignified cellulose set forth in claim 9, with the added step that the final mixed solution obtained therein be dehydrated thus yielding a solid containing approximately 20% of nitrogen.

References Cited in the file of this patent

UNITED STATES PATENTS

| | | |
|---|---|---|
| 1,930,542 | Smith | Oct. 17, 1933 |
| 1,933,445 | Murdock | Oct. 31, 1933 |
| 2,027,766 | Davis | Jan. 14, 1936 |
| 2,301,314 | Monotonna | Nov. 10, 1942 |
| 2,574,027 | Farber | Nov. 6, 1951 |
| 2,597,430 | Baudiniere | May 20, 1952 |
| 2,735,756 | Farber | Feb. 21, 1956 |